US008560310B1

(12) United States Patent  (10) Patent No.: US 8,560,310 B1
Zhang et al.  (45) Date of Patent: Oct. 15, 2013

(54) METHOD AND APPARATUS PROVIDING IMPROVED VOICE ACTIVATED FUNCTIONS

(75) Inventors: Ya-Xin Zhang, Shanghai (CN); Qing-Feng Bao, Shanghai (CN)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/466,402

(22) Filed: May 8, 2012

(51) Int. Cl.
  *G10L 15/00* (2013.01)
  *G10L 15/26* (2006.01)
  *G10L 15/06* (2013.01)
  *G10L 17/00* (2013.01)
  *G10L 15/04* (2013.01)
  *G10L 21/00* (2013.01)
  *G06F 17/27* (2006.01)
  *G06F 17/21* (2006.01)

(52) U.S. Cl.
  USPC ........... 704/231; 704/235; 704/243; 704/246; 704/257; 704/251; 704/270; 704/270.1; 704/275; 704/9; 704/10

(58) Field of Classification Search
  USPC ......... 704/231, 235, 243, 246, 257, 251, 270, 704/270.1, 275, 9, 10
  See application file for complete search history.

(56) References Cited

U.S. PATENT DOCUMENTS

| | | | | |
|---|---|---|---|---|
| 5,752,230 | A * | 5/1998 | Alonso-Cedo | 704/270 |
| 6,163,767 | A * | 12/2000 | Tang et al. | 704/231 |
| 6,269,335 | B1 * | 7/2001 | Ittycheriah et al. | 704/270 |
| 6,418,328 | B1 * | 7/2002 | Shon | 455/563 |
| 6,925,154 | B2 * | 8/2005 | Gao et al. | 379/88.03 |
| 7,299,181 | B2 * | 11/2007 | Ju et al. | 704/257 |
| 7,769,592 | B2 * | 8/2010 | Kemble et al. | 704/275 |
| 2005/0144014 | A1 * | 6/2005 | Janke et al. | 704/277 |
| 2006/0004572 | A1 * | 1/2006 | Ju et al. | 704/243 |
| 2007/0047726 | A1 * | 3/2007 | Jabbour et al. | 379/373.02 |
| 2007/0124147 | A1 * | 5/2007 | Gopinath et al. | 704/257 |
| 2007/0143100 | A1 * | 6/2007 | Agapi et al. | 704/9 |
| 2008/0059172 | A1 * | 3/2008 | Bocking | 704/235 |
| 2008/0267364 | A1 * | 10/2008 | Janke et al. | 379/88.03 |
| 2009/0187399 | A1 * | 7/2009 | O'Dell | 704/8 |
| 2011/0022386 | A1 * | 1/2011 | Gatzke et al. | 704/235 |

FOREIGN PATENT DOCUMENTS

WO  WO 99/16051  * 4/1999 ............... G10L 5/06

* cited by examiner

*Primary Examiner* — Edgar Guerra-Erazo
(74) *Attorney, Agent, or Firm* — Barry W. Chapin

(57) ABSTRACT

A method, apparatus and computer program product for providing improved voice activated functions is presented. A grammar is provided from a collection of names for use in a voice activated operation, the grammar including the names and variations of the names. A preferred one of the variations of a name is associated with a name in the grammar. A preferred one of the variations of the name is received and is used to perform a task.

20 Claims, 3 Drawing Sheets

METHOD AND APPARATUS PROVIDING IMPROVED VOICE ACTIVATED FUNCTIONS

BACKGROUND

Cellular telephones have become ubiquitous. A cellular telephone (also known as a mobile phone, cell phone and a hand phone) is a device that can make and receive telephone calls over a radio link while moving around a wide geographic area. It does so by connecting to a cellular network provided by a mobile phone operator, allowing access to the public telephone network. In addition to telephony, modern mobile phones also support a wide variety of other services such as text messaging, Multimedia Messaging Service (MMS), email, Internet access, short-range wireless communications (infrared, Bluetooth), business applications, gaming and photography. Mobile phones that offer these and more general computing capabilities are typically referred to as smart phones.

One typical use of a cell phone is to dial phone calls on phones equipped with Automated Speech Recognition (ASR). This feature is sometimes referred to as Voice Activated Name Dial (VAND). Any spoken word or words can be a voice tag, and can be used to dial a contact, send a text message, or open an application. Additionally, more and more vehicles are coming equipped with hands-free voice tag automation, for example to get directions using a Global Positioning system (GPS), to dial an integrated mobile phone, or to select a song or musical artist to play.

SUMMARY

Conventional mechanisms such as those explained above suffer from a variety of deficiencies. For a general mobile phone user using a voice dialing feature, it is common for the user to speak a person's name in a normal verbal way that the system is unable to recognize. For example a person may be listed in an address book or contact list as William Smith, but is more commonly known as Bill Smith or Billy Smith. This situation may occur when the contact list entry was acquired by way of an email which lists the sender of the email as William Smith. A user may say "call Billy Smith" but that entry is not known. Accordingly, the user may feel the voice dialing is not working properly and stop using it. Some users may learn from this experience and correctly say the name as it is entered in the contacts list, but this does not prevent the user from using the person's name in the normal way the next time and having the system again be unable to recognize the name, which is inconvenient for the user. The same concepts also apply to other voice activated functions. A user may request "directions to Fenway" from a GPS device and be provided with two options, e.g., Fenway Park, Boston, Ma or Fenway Gardens, Boston Mass.

The presently described method and apparatus for improved voice activated functions includes a specific user interface (UI) design targeting the differences between the text form of person's name or function and their verbal presentations. Considering all these sort of verbal presentations in the ASR grammar brings a more user-friendly experience to the voice activated function users. For certain dialects (e.g., Chinese) a user may have a poor experience using voice activated functions due to the inconsistency of a grammar entry and the verbal representation of users. For example, for a name having three characters (or three syllables), people tend to enter the full name in the address book of the device, but often say the given name of last two characters (or two syllables). Entry Wang Da Wen would therefore be spoken as simply Da Wen. However, if the name has two characters, people tend to say the full name. Entry Li Wei would be spoken as Li Wei. It is common practice that people say their colleague, classmate, and friends names with the prefix "elder" or "younger" appended to the family name. Entry Zhang Yaxin would be spoken as Lao Zhang, or entry Bao Qingfeng would be spoken as Xiao Bao.

In a particular embodiment of a method for providing improved voice activated functions, the method includes providing a grammar from a collection of names, the grammar including the names and variations of the names. The variations may include shortened versions of the original names and also may include particular prefixes with a shortened version of the name. A preferred one of the variations of a name is associated with the name in the grammar. The method further includes receiving the preferred one of the variations of the name and using a name associated with the variation to perform a task.

Other embodiments include a computer readable medium having computer readable code thereon for providing improved voice activated functions. The computer readable medium includes instructions for providing a grammar from a collection of names, the grammar including the names and variations of the names. The variations may include shortened versions of the original names and also may include particular prefixes with a shortened version of the name. A preferred one of the variations of a name is associated with the name in the grammar. The method further includes receiving the preferred one of the variations of the name and using a name associated with the variation to perform a task.

Still other embodiments include a computerized device, configured to process all the method operations disclosed herein as embodiments of the invention. In such embodiments, the computerized device (e.g., a cell phone) includes a memory system, a processor, and a communications interface in an interconnection mechanism connecting these components. The memory system is encoded with a process that provides improved voice activated functions as explained herein that when performed (e.g. when executing) on the processor, operates as explained herein within the cell phone to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing improved voice activated functions as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Nuance Communications, Inc.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1:
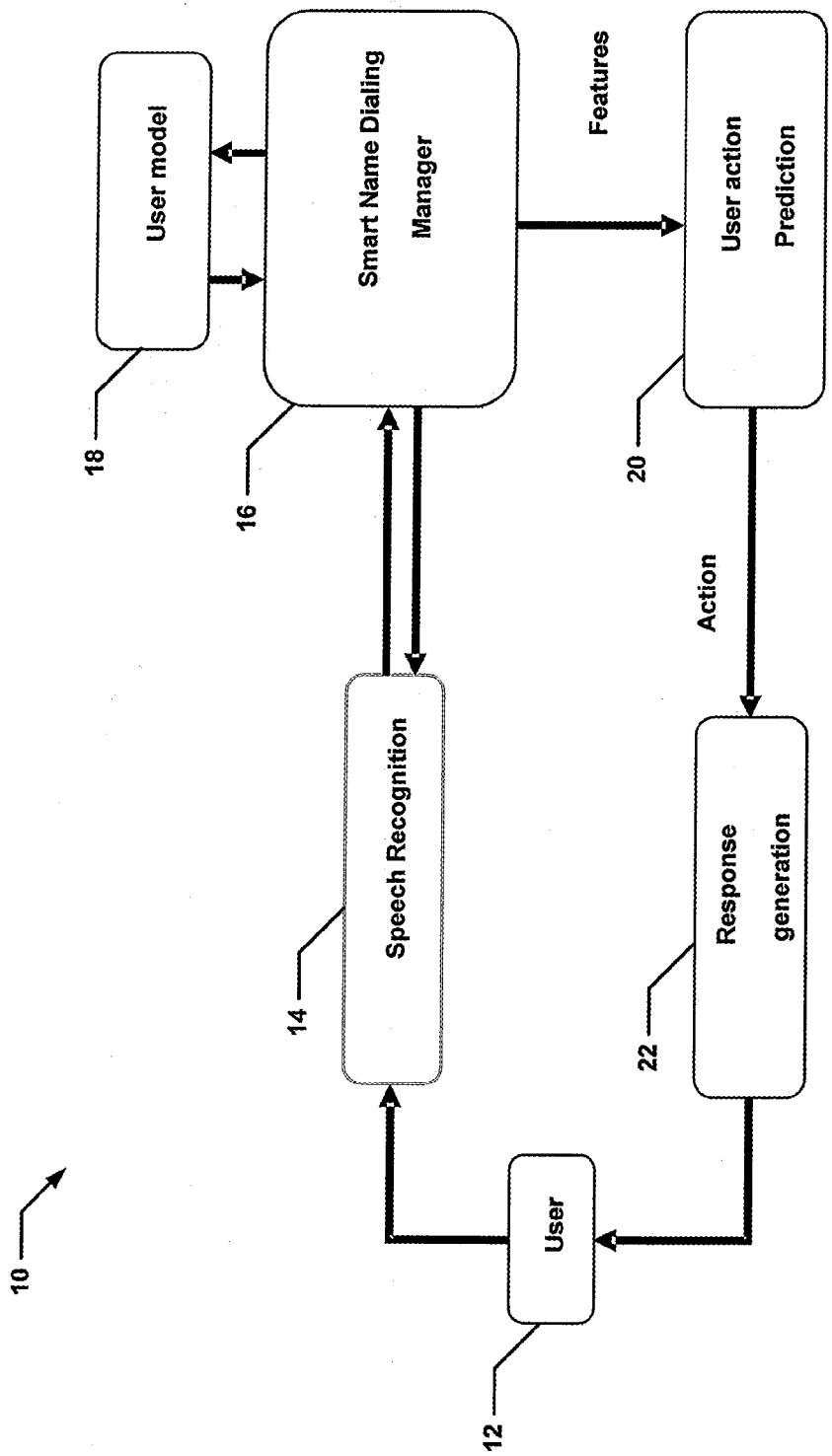
FIG. 1 depicts a block diagram of a smart name dialing system in accordance with embodiments of the invention.

While a system for proving improved voice activated functions is described with respect to name dialing on a cellular telephone, the concepts described apply to other uses as well. The other uses include, but are not limited to, sending text messages, requesting GPS directions and the like. Referring now to FIG. 1, a particular embodiment of a system 10 for providing improved voice activated functions is shown. The system 10 includes a speech recognition element 14, which is in communication with a smart name dialing manager 16. The smart name dialing manager is in communication with a user model 18 and with a user action prediction element 20. The user action prediction element 22 provides output to a User 12, who initiates the process by providing an input to speech recognition element 14.

The speech recognition element 14 receives spoken commands as an input and converts the spoken commands to a text string. This text string is then forwarded to the Smart Name Dialing Manager 16 where the command can be further processed.

The Smart Name Dialing Manager module 16 is responsible for updating the user model 18 according to user input. The Smart Name Dialing Manager module 16 will also update the grammar for speech recognition and send user model and user input to user action prediction module 20.

The user model 18 is used to the customer habit and other information including: when user call the name, how many times user call the name, and which verbal presentation is used to call the name. Initially, the user model will cover all possible verbal presentations, following which, the user model will keep being updated according to user input.

The user action predication module 20 is used to make a proper decision according the input. It will use statistical information of user input and get the best action to response to the user's input. A series of sample rules will be used to make the decision The response generation module 22 will produce a dialog or other UI interface according to the action. The dialog includes one or more of a selection dialog, a dialing dialog and a confirmation dialog. The selection dialog will show a list of contacts which match the requested contact and are presented to the user (either in visual form or an audio form) for the user to make a selection of the desired contact from the presented list of contacts. The dialing dialog will show which person is being called. The confirmation dialog will show who was called.

An example is described wherein an address book of a smart phone contains only three entries. It should be understood that this is for explanation purposes only, and is not meant to be limiting in any manner. Typical address books or contact list on smart phones can contain several hundred or more names.

In this example, the address book of the smart phone contains the following three entries:
Wang Da Wen 王大文
Wang Li Tao 王力涛
Wang Pei 王佩

The initial user model will generate a grammar which contains variations of these names. In certain dialects (e.g., Chinese) it is common for a name having three or more elements (e.g., Wang Da Wen) to be spoken as simply two elements (e.g., Da Wen). For a name having two elements (e.g., Li Wei) it is common practice to be spoken as the full name (e.g., Li Wei). People may further refer to someone as "elder" or "younger" and this is added to the family name. Instead of speaking the person's full name (e.g., Zhang Yaxin), the person may be referred to as simply Lao Zhang (elder Zhang) or Bao Qingfeng may be referred to as Xiao Bao (younger Bao). There exists differences between the text form of a person's name and the verbal representation used by a user to reference the same person (or location). This may be due in part to an entry being made in a contact list from an email which may use the persons formal name instead of a more common variation of the formal name.

Figure 2A:
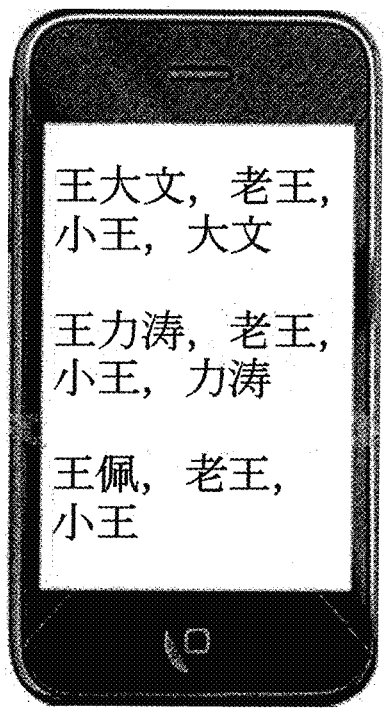
FIG. 2A is a table showing an example of a grammar from an initial user model.

Referring now to FIG. 2A, given the three names Wang Da Wen, Wang Li Tao, and Wang Pei a grammar would be generated by the initial user model containing the following elements:

Wang Da Wen, Lao Wang, Xiao Wang, Da Wen
Wang Li Tao, Lao Wang, Xiao Wang, Li Tao;
Wang Pei, Lao Wang, Xiao Wang
Wang Da Wen is also referred to as Lao Wang (elder), Xiao Wang (younger) and
Da Wen (two element variation of a three element name). Similarly, Wang Li Tao is also referred to as Lao Wang (elder), Xiao Wang (younger) and Li Tao (two element variation of a three element name). Wang Pei is also referred to as Lao Wang (elder), Xiao Wang (younger) and Wang Pei (two element full name). The initial grammar therefore contains a total of twelve entries.

In use, a user 12 may say "call Lao Wang". This is received by the speech recognition element 14 and converted to text. This text is provided to the smart name dialing manager 16. The smart name dialing manager forwards the name "Lao Wang" to the grammar in user model 18. The user model 18 returns three possible names to call (Wang Da Wen, Wang Li Tao, and Wang Pei). These three possible name matches are provided to user call prediction element 20 which determines the user must select one of the three possibilities. This information is forwarded to the response generation element 22 which will provide a communication to the user 12 to select one of the three possibilities to call. For a smart phone user, when the user speaks the command "call Lao Wang", the smart phone will come back with a screen showing the three possible Lao Wang choices. The user will then say the desired name (Wang Da Wen).

The user 12 will select one of the three possibilities (e.g., Wang Da Wen) and the call will be placed. This user selection is further used to update the user model 18 that when the user references Lao Wang, the user wants Wang Da Wen. The grammar in the user model 18 is updated so such that Wang Da Wen is also referred to as Lao Wang, and the entries of the other variations of Wang Da Wen (the Xaio Wang entry and the Da Wen entry) are removed from the grammar.

A similar process takes place when the user 12 may say "call Li Tao". This is received by the speech recognition element 14 and converted to text. This text is provided to the smart name dialing manager 16. The smart name dialing manager forwards the name "Li Tao" to the grammar in user model 18. The user model 18 returns name to call (Wang Li Tao). This name is provided to user call prediction element 20 which determines the user wants to call Wang Li Tao. This information is forwarded to the response generation element 22 which will provide a communication to the user 12 to call Wang Li Tao.

This user selection is further used to update the user model 18 that when the user references Li Tao, the user wants Wang Li Tao. The grammar in the user model 18 is updated so such that Wang Li Tao is also referred to as Li Tao, and the entries of the other variations of Wang Li Tao (the Xaio Wang entry and the Lao Wang entry) are removed from the grammar.

For the third contact, the user 12 may say "call Xiao Wang". This is received by the speech recognition element 14 and converted to text. This text is provided to the smart name dialing manager 16. The smart name dialing manager forwards the name "Xiao Wang" to the grammar in user model 18. The smart name dialing manager forwards the name "Xiao Wang" to the grammar in user model 18. The user model 18 returns name to call (Wang Pai). This name is provided to user call prediction element 20 which determines the user wants to call Wang Pai. This information is forwarded to the response generation element 22 which will provide a communication to the user 12 to call Wang Pai.

This user selection is further used to update the user model 18 that when the user references Xiao Wang, the user wants Wang Pai. The rules for updating the user model take into account several factors including when user called the name, how many times the user called the name, and which verbal presentation is used to call the name. Initially, the user model will cover all possible verbal presentations, following which, the user model will keep being updated according to user input.

Figure 2B:
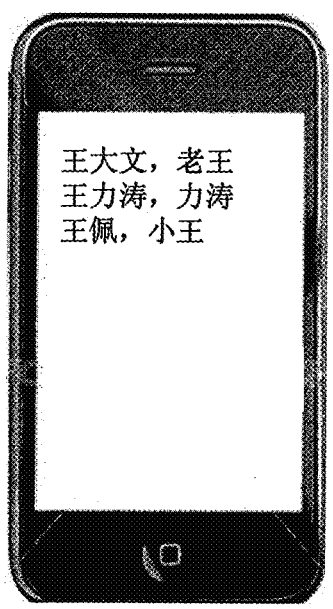
FIG. 2B is a table showing a grammar from a user model processed in accordance with the present invention.

As shown in FIG. 2B, the grammar in the user model 18 is updated so such that Wang Pai is also referred to as Xiao Wang, and the entries of the other variations of Wang Pai (the Xaio Wang entry and the Wang Pai entry) are removed from the grammar. The grammar items in the address book become Wang Da Wen, Lao Wang
Wang Li Tao, Li Tao
Wang Pai, Xiao Wang The total grammar items are reduced from eleven to six by automatically removing the redundant initial grammar items. This may have a further benefit if there is a specific size limit regarding an address book or contact list. The next time, if a user says "call Lao Wang", the system will go to call Wang Da Wen directly.

The above-described example would also apply to other voice activated functions, such as requesting directions from a GPS device, requesting music by a particular artist from a music player or requesting music of a particular genre.

Figure 3:
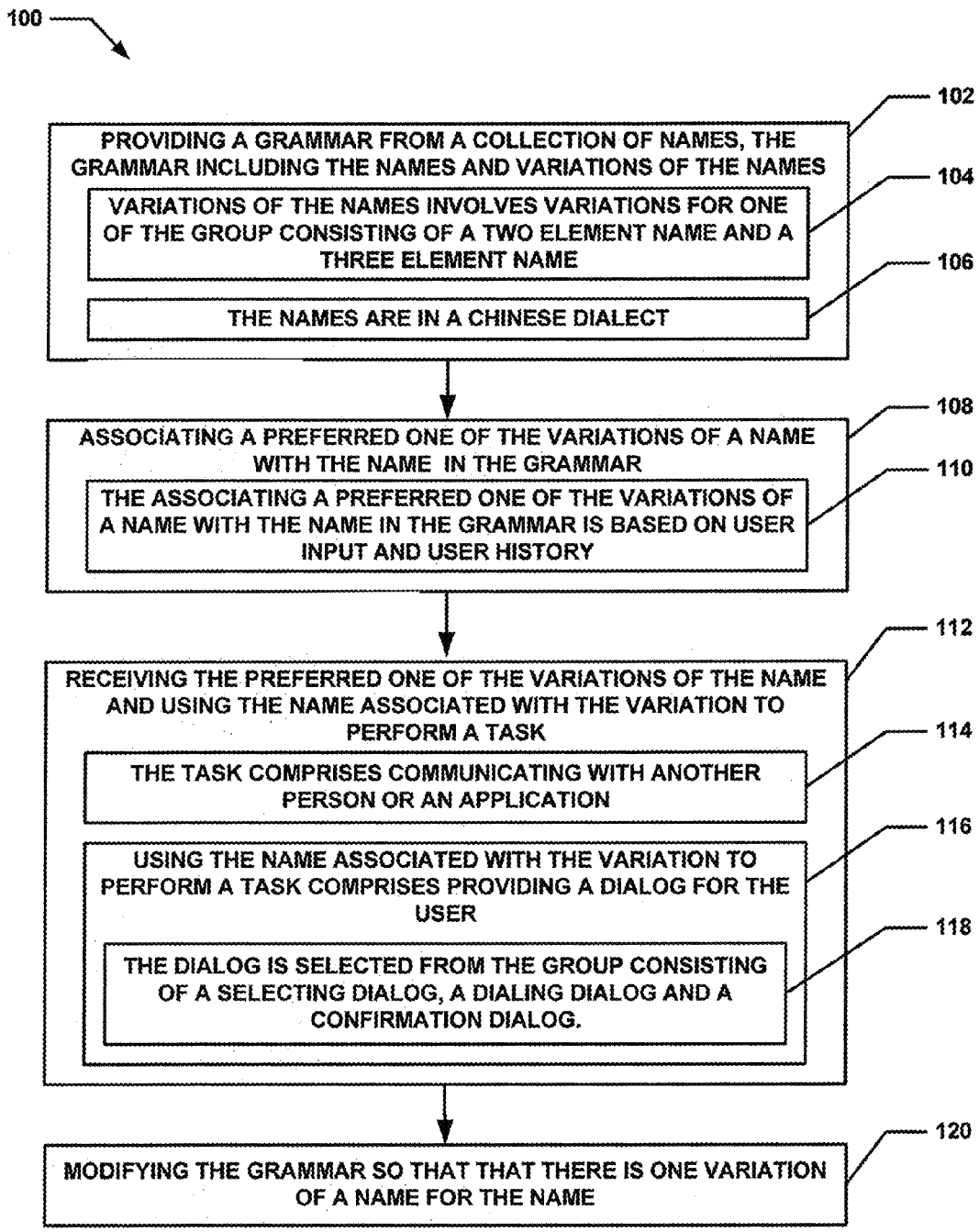
FIG. 3 depicts a flow diagram of a particular embodiment of a method for providing smart name dialing in accordance with embodiments of the invention.

A flow chart of a particular embodiment of the presently disclosed method 100 is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method for providing a voice activated name dial service is presented. Method 100 begins with processing block 102 which discloses providing a grammar from a collection of names for use in a voice activated operation, the grammar including the names and variations of the names. As shown in processing block 104 variations of the names involves variations for one of the group consisting of a two element name and a three element name. As shown in processing block 106, in a particular embodiment, names are in a Chinese dialect.

For example an address book of a smart phone contains the following three entries:
Wang Da Wen 王大文
Wang Li Tao 王力涛
Wang Pei 王佩

Given the three names Wang Da Wen, Wang Li Tao, and Wang Pei a grammar would be generated by the initial user model containing the following elements:
Wang Da Wen, Lao Wang, Xiao Wang, Da Wen
Wang Li Tao, Lao Wang, Xiao Wang, Li Tao;
Wang Pei, Lao Wang, Xiao Wang Processing block 108 recites associating a preferred one of the variations of a name with the name in the grammar. As shown in processing block 110 the associating a preferred one of the variations of a name with the name in the grammar is based on user input and user history. A user 12 may say "call Lao Wang" and three possible names to call (Wang Da Wen, Wang Li Tao, and Wang Pei) are presented to the user. Based on user history and feedback, a preferred one of the variations of the name will be associated with the name.

Processing block 112 states receiving the preferred one of the variations of the name and using the name associated with the variation to perform a task. Processing block 114 shows wherein the task comprises communicating with another person or an application. As shown in processing block 116 the using the name associated with the variation to perform a task comprises providing a dialog for the user. As further shown in processing block 118 the dialog is selected from the group consisting of a selection dialog, a dialing dialog and a confirmation dialog. The selection dialog will show a list of contacts which match the requested contact and are presented to the user (either in visual form or an audio form) for the user to make a selection of the desired contact from the presented list of contacts. The dialing dialog will show which person is being called. The confirmation dialog will show who was called. Referring back to the example above, the user will select one of the three possibilities (e.g., Wang Da Wen) and the call will be placed.

Processing continues with processing block 126 which discloses modifying the grammar so that that there is one variation of a name for the name. This user selection is further used to update the user model that when the user references Xiao Wang, the user wants Wang Pai. The grammar in the user model 18 is updated so such that Wang Pai is also referred to as Xiao Wang, and the entries of the other variations of Wang Pai (the Xaio Wang entry and the Wang Pai entry) are removed from the grammar. This results in a savings of storage space used by the grammar and contact list, so that additional contacts can be added to the existing contact list.

VAND is one of the most common features used on a cellular phone. The above described method and apparatus providing improved voice activated functions enhances system performance and user experience, making the device easier and more efficient to use. While this was described with respect to a cell phone, it should be appreciated that other uses (automotive use for placing calls or engaging a Global Positioning System (GPS) system or requesting music by a particular artist from a music player or requesting a certain genre of music from a music player) are also encompassed by the present invention.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method, comprising:
providing, from a computerized user model, a grammar from a collection of names for use in a voice activated operation, said grammar including said names and variations of said names;
associating, by a computerized name manager, a preferred one of said variations of a name with said name in said grammar based on at least one end-user input;
updating, by said computerized name manager, said computerized user model based on said at least one end-user input;
receiving, at a computerized name manager, said preferred one of said variations of said name, and determining, by said computerized user action predictor, a task to be performed based at least on said preferred one of said variations of said name; and
performing, by a computerized response generator, said task using said name associated with said variation.

2. The method of claim 1 further comprising modifying, by said computerized name manager, said grammar so that there is one variation of a name for said name.

3. The method of claim 1 wherein said task comprises communicating with another person or an application.

4. The method of claim 1 wherein variations of said names involves variations for one of the group consisting of a two element name and a three element name.

5. The method of claim 1 wherein said associating, by said computerized name manager, a preferred one of said variations of a name with said name in said grammar is based on said at least one end-user input and end-user history.

6. The method of claim 1 wherein said names are in a Chinese dialect.

7. The method of claim 1 wherein said performing, by said computerized response generator, said task using said name associated with said variation comprises providing a dialog for said end-user.

8. The method of claim 7 wherein said dialog is selected from the group consisting of a dialing dialog, a selection dialog and a confirmation dialog.

9. A non-transitory computer readable storage medium having computer readable code thereon for providing voice-activated operation, the medium including instructions in which a computer system performs operations comprising:
providing, from a user model, a grammar from a collection of names for use in a voice activated operation, said grammar including said names and variations of said names;
associating a preferred one of said variations of a name with said name in said grammar based on at least one end-user input;
updating said user model based on said at least one end-user input;
receiving said preferred one of said variations of said name;
determining a task to be performed based at least on said preferred one of said variations of said name; and
performing said task using said name associated with said variation.

10. The computer readable storage medium of claim 9 further comprising instructions for modifying said grammar so that there is one variation of a name for said name.

11. The computer readable storage medium of claim 9 further comprising instructions wherein said task comprises communicating with another person or an application.

12. The computer readable storage medium of claim 9 further comprising instructions wherein variations of said names involves variations for one of the group consisting of a two element name and a three element name.

13. The computer readable storage medium of claim 9 further comprising instructions wherein said associating a preferred one of said variations of a name with said name in said grammar is based on said at least one end-user input and end-user history.

14. The computer readable storage medium of claim 9 further comprising instructions wherein said names are in a Chinese dialect.

15. The computer readable storage medium of claim 9 further comprising instructions wherein said using said name associated with said variation to perform a task comprises providing a dialog for said end-user.

16. The computer readable storage medium of claim 15 further comprising instructions wherein said dialog is selected from the group consisting of a dialing dialog, a selection dialog and a confirmation dialog.

17. A computer system, comprising:
a memory;
a processor;
a communications interface; and
an interconnection mechanism coupling the memory, the processor, and the communications interface;
wherein the memory is encoded with an application providing voice activated operation, that when performed on the processor, provides a process for processing information, the process causing the computer system to perform the operations of:
providing, from a user model, a grammar from a collection of names for use in a voice activated operation, said grammar including said names and variations of said names;
associating a preferred one of said variations of a name with said name in said grammar based on at least one end-user input;
updating said user model based on said at least one end-user input;
receiving said preferred one of said variations of said name;
determining a task to be performed based at least on said preferred one of said variations of said name; and
performing said task using said name associated with said variation.

18. The computer system of claim 17 wherein said processor includes a speech recognition element for receiving input from said end-user, a smart name dialing manager in communication with said speech recognition element, said user model in communication with said smart name dialing manager, a user action prediction module in communication with said smart name dialing manager, and a response generation module in communication with said user action prediction module and providing output to said end-user.

19. The computer system of claim 17 wherein said grammar is modified so that there is one variation of a name for said name.

20. The computer system of claim 17 wherein said associating a preferred one of said variations of a name with said name in said grammar is based on said at least one end-user input and end-user history.

* * * * *